(12) United States Patent
Shoji

(10) Patent No.: US 7,016,078 B2
(45) Date of Patent: Mar. 21, 2006

(54) IMAGE-FORMING APPARATUS AND METHOD FOR EVALUATING GRADATION CHARACTERISTIC

(75) Inventor: Madoka Shoji, Hino (JP)

(73) Assignee: Konica Corporation, Tokyo (JP)

( * ) Notice: Subject to any disclaimer, the term of this patent is extended or adjusted under 35 U.S.C. 154(b) by 1059 days.

(21) Appl. No.: 09/954,028

(22) Filed: Sep. 18, 2001

(65) Prior Publication Data

US 2002/0054353 A1    May 9, 2002

(30) Foreign Application Priority Data

Sep. 19, 2000   (JP) ............................. 2000-283124

(51) Int. Cl.
  *G06K 15/00* (2006.01)
  *H04N 1/46* (2006.01)

(52) U.S. Cl. ....................... 358/1.9; 358/3.01; 358/3.1; 358/534

(58) Field of Classification Search ................. 358/1.9, 358/2.1, 3.01, 3.1, 3.21, 471, 3.06, 3.3, 534; 382/169

See application file for complete search history.

(56) References Cited

U.S. PATENT DOCUMENTS

| | | | | |
|---|---|---|---|---|
| 5,209,162 A | * | 5/1993 | Whitbey | 101/211 |
| 5,754,694 A | * | 5/1998 | Villalba | 382/226 |
| 5,889,928 A | * | 3/1999 | Nakamura et al. | 358/1.9 |
| 6,864,995 B1 | * | 3/2005 | Nogiwa et al. | 358/1.9 |
| 2002/0054353 A1 | * | 5/2002 | Shoji | 358/3.01 |
| 2004/0046818 A1 | * | 3/2004 | Velde | 347/15 |
| 2004/0160618 A1 | * | 8/2004 | Nogiwa | 358/1.9 |
| 2004/0253012 A1 | * | 12/2004 | Ishibashi | 399/49 |
| 2005/0128539 A1 | * | 6/2005 | Takano et al. | 358/521 |
| 2005/0185837 A1 | * | 8/2005 | Takano et al. | 382/162 |

* cited by examiner

*Primary Examiner*—Jerome Grant, II
(74) *Attorney, Agent, or Firm*—Finnegan, Henderson, Farabow, Garrett & Dunner, L.L.P.

(57) ABSTRACT

An image-forming apparatus processes image signals based on a predetermined gradation-converting curve. The predetermined gradation-converting curve includes at least one of: a first gradation in which a maximum absolute-value of a difference between a lightness gradation curve and its smoothed curve in a range of about 1/10 of its gradation number is not greater than 1; a second gradation in which a maximum absolute-value of first-order differential values of a difference curve between a lightness gradation curve and its smoothed curve in a range of about 1/10 of its gradation number is not greater than 100; and a third gradation, in which a maximum absolute-value of first-order differential values of a difference curve between a first smoothed curve in a range of about 1/100 of a gradation number and a second smoothed curve in a range of about 1/10 of a gradation number, is not greater than 100.

23 Claims, 8 Drawing Sheets

EXAMPLE OF GRADATION CURVE

INDICATOR CURVE OF GRADATION SMOOTHNESS

● SHOWS POSITIONS WHERE A GAP IS OBSERVED BY VISUAL EVALUATION
— SHOWS THRESHOLD LEVEL (40) FOR CHEST REGION
← SHOWS PEAKS EXCEEDING THRESHOLD

IMAGE-FORMING APPARATUS AND METHOD FOR EVALUATING GRADATION CHARACTERISTIC

BACKGROUND OF THE INVENTION

This invention relates to a technology for evaluating an image forming apparatus, and in particular, to a method for evaluating gradation capable of exactly evaluating the gradation characteristics of an image forming apparatus and an image forming apparatus to which this method for evaluating gradation is applied.

It has heretofore been practiced that an image of a patient as a radiographic object is formed, for example, in a radiographic film composed of a silver halide photosensitive material, and is used in diagnosis by a medical doctor. However, a radiographic film is not convenient for storing, and because it is such one that an image is formed in it by chemical reaction, it has a problem that the deterioration of image is produced to a certain degree with the passage of time.

In contrast with the above, in recent years, it has been put into practice to devise a method of obtaining radiographic image information without using a radiographic film which is inconvenient for storing and handling. For example, it has been proposed a radiation image reading apparatus (Computed Radiography, hereinafter abbreviated as CR) in which an image signal is obtained by it that an imaging plate substantially composed of a stimulable phosphor substance is used, a radiation image is picked up as stimulated emission by using excitation light after it has been temporarily accumulated, and this emitted light is photoelectrically converted.

Further, also it has been proposed lately an apparatus for reading radiation image information by combining a radiation-phosphor or a radiation-photoconductor with a two-dimensional semiconductor detector such as a TFT switching device (Flat Panel Detector, hereinafter abbreviated as FPD).

Further, also it has spread an image-inputting apparatus other than a simple X-ray radiography such as an X-ray computed tomography (X-ray CT apparatus) or a magnetic resonance imaging apparatus (MRI apparatus). Further, it has become more and more frequent an opportunity when a plurality of medical image-inputting apparatus of different types to provide a medical image such as an ultrasonic image diagnosis apparatus, an electronic endoscope, and a retinal camera are used in a mixed manner in a hospital. These medical image-inputting apparatus (modality) provides image information as a digital signal in most cases.

On the other hand, when these medical images are diagnosed, it is mostly employed a method in which an image is observed as a hard copy recorded on a light-transmitting recording medium and/or light-reflecting recording medium. For a medical image-recording apparatus, which records medical image information on a recording medium, a method in which an image is recorded by exposing a recording medium using a silver halide recording material to a laser beam, a method of thermal color development, a method of thermal melt transfer, and a method of thermal sublimation transfer have been proposed. Further, lately, expectation has been placed on a possibility that a medical image is recorded by using a printer of an ink jet type having such an advantage as low cost. It has also become frequent an opportunity to use these medical image-recording apparatus of different recording methods in a mixed manner in a hospital.

Incidentally, there is a general evaluation that an image formed by an ink jet printer is easy to become granular to present a comparatively bad image quality. According to a study by the inventors of this invention, it has been found out that the granular roughness become remarkable to deteriorate image quality owing to the gradation of the image being not smooth. Further, also it has been found out that one reason of the gradation being not smooth is that an image is formed by using quasi-halftone processing in ink jet print method, and if this processing is not suitable, gradation does not become smooth in most cases. Accordingly, it can be said that the quality of an image formed by a printer can be improved by evaluating and improving the gradation characteristic of the printer.

As for the above-mentioned method for evaluating a gradation characteristic, there is such one that a jump in gradation and the degree of gradation loss are measured quantitatively by whether or not the difference between neighboring gradation levels in terms of lightness or density is under a certain threshold value. However, there is a problem that, in the case where a gradation curve has a shape of folded lines, a gap to be observed as existing at the fold portion cannot be evaluated by the above-mentioned evaluation method.

SUMMARY OF THE INVENTION

To overcome the abovementioned drawbacks in conventional image-forming apparatus, it is an object of the present invention to provide an image-forming apparatus having an excellent gradation characteristic and a method for evaluating a gradation characteristic to actualize such an image-forming apparatus.

Accordingly, to overcome the cited shortcomings, the abovementioned object of the present invention can be attained by image-forming apparatus and methods for evaluating a gradation characteristic of an image-forming apparatus, described as follow.

(1) An image-forming apparatus, which conducts a quasi-halftone processing in respect to image signals, comprising: an inputting section to input the image signals; and a converting section to apply a gradation-converting processing to the image signals inputted by the inputting section, on the basis of a predetermined gradation-converting curve, to generate converted image signals; wherein the predetermined gradation-converting curve includes at least one of: a first gradation characteristic in which a maximum absolute value of a difference between a lightness gradation curve obtained on the basis of lightness and/or density varying image signals generated by the image-forming apparatus and its smoothed curve in a range of about 1/10 of its gradation number is not greater than 1; a second gradation characteristic in which a maximum absolute-value of first order differential values of a difference curve between a lightness gradation curve obtained on the basis of lightness and/or density varying image signals generated by the image-forming apparatus and its smoothed curve in a range of about 1/10 of its gradation number is not greater than 100; and a third gradation characteristic in which a maximum absolute-value of first order differential values of a difference curve between a first smoothed curve in a range of about 1/100 of a gradation number and a second smoothed curve in a range of about 1/10 of a gradation number, both of which are generated on the basis of a lightness gradation curve obtained on the basis of lightness and/or density varying image signals formed by the image-forming apparatus, is not greater than 100.

(2) The image-forming apparatus of item 1, wherein the image-forming apparatus employs an ink-jetting method.

(3) The image-forming apparatus of item 1, further comprising: a setting section to set the gradation-converting curve; a quasi-halftone processor to apply the quasi-halftone processing to the converted image signals; and a gradation-evaluating section to evaluate the gradation-converting curve set by the setting section.

(4) An image-forming apparatus, comprising: an inputting section to input image signals; a setting section to set a gradation-converting curve; a converting section to apply a gradation-converting processing to the image signals inputted by the inputting section, on the basis of the gradation-converting curve, to generate converted image signals; a quasi-halftone processor to apply a quasi-halftone processing to the converted image signals; and a gradation-evaluating section to evaluate the gradation-converting curve set by the setting section.

(5) The image-forming apparatus of item 4, wherein the image-forming apparatus employs an ink-jetting method.

(6) The image-forming apparatus of item 4, wherein the gradation-evaluating section utilizes a smoothed curve of the gradation-converting curve.

(7) The image-forming apparatus of item 6, wherein the gradation-evaluating section conducts at least one of: a first determining-action to determine whether or not a maximum absolute-value of difference values between a lightness gradation curve and its smoothed curve is lower than 1, by obtaining the lightness gradation curve from the gradation-converting curve, set by the setting section, and by obtaining the smoothed curve from the lightness gradation curve in a range of about 1/10 of its gradation number; a second determining-action to determine whether or not a maximum absolute-value of first order differential values of a difference curve between a lightness gradation curve and its smoothed curve is lower than 100, by obtaining the lightness gradation curve from the gradation-converting curve, set by the setting section, and by obtaining the smoothed curve from the lightness gradation curve in a range of about 1/10 of its gradation number; and a third determining-action to determine whether or not a maximum absolute-value of first order differential values of a difference curve between a first smoothed curve and a second smoothed curve is lower than 100, by obtaining the lightness gradation curve from the gradation-converting curve, set by the setting section, and by obtaining the first smoothed curve from the lightness gradation curve in a range of about 1/10 of its gradation number and by obtaining the second smoothed curve from the lightness gradation curve in a range of about 1/100 of its gradation number.

(8) The image-forming apparatus of item 4, further comprising: a warning section to issue a warning when the gradation-evaluating section determines that the gradation-converting curve, set by the setting section, is not good.

(9) The image-forming apparatus of item 4, further comprising: a gradation-modifying section to modify the gradation-converting curve, when the gradation-evaluating section determines that the gradation-converting curve, set by the setting section, is not good, to generate a modified gradation-converting curve.

(10) The image-forming apparatus of item 9, wherein an operation for modifying the gradation-converting curve is automatically performed in the gradation-modifying section.

(11) The image-forming apparatus of item 9, wherein the gradation-evaluating section reevaluates the modified gradation-converting curve, after modified by the gradation-modifying section.

(12) The image-forming apparatus of item 4, further comprising: a memory to store chart-image signals corresponding to a calibration-chart image utilized for a calibrating operation; a printing section to print the calibration-chart image based on the chart-image signals; a data inputting section to input measured data; and a compensation curve creating section to create a compensation curve from the measured data inputted by the data inputting section; wherein the setting section establishes the compensation curve as the gradation-converting curve.

(13) The image-forming apparatus of item 12, wherein the data inputting section comprises: a measuring device to measure density and/or lightness of the calibration-chart image.

(14) A method for evaluating a gradation characteristic of an image-forming apparatus, comprising a step of: finding an index of the gradation characteristic by utilizing a smoothed curve of a gradation curve.

(15) The method of item 14, wherein the gradation curve is defined in a scale of lightness.

(16) The method of item 14, wherein the index of the gradation characteristic is found from a difference between the gradation curve and the smoothed curve.

(17) The method of item 14, wherein the index of the gradation characteristic is found by first order differentiating a difference curve between the gradation curve and the smoothed curve.

(18) The method of item 14, wherein the index of the gradation characteristic is found by first order differentiating a difference curve between a smoothed curve in a narrow range and another smoothed curve in a wide range.

(19) The method of item 14, wherein the smaller a maximum value of the index of the gradation characteristic is, the better a result of evaluating the gradation characteristic is.

(20) The method of item 14, wherein the smaller a number of absolute peak values of the index of the gradation characteristic, which are greater than a threshold value, is, the better a result of evaluating the gradation characteristic is.

(21) The method of item 14, wherein the smaller a value obtained by squaring and integrating a curve of the index of the gradation characteristic, the better a result of evaluating the gradation characteristic is.

(22) The method of item 20, wherein the image-forming apparatus can form a subject image utilized for a medical treatment, and changes the threshold value in response to at least one of a kind of image-capturing apparatus utilized for capturing an inputted image and a concerned part of a subject.

(23) The method of item 14, wherein the image-forming apparatus comprises a quasi-halftone processor.

Further, to overcome the abovementioned problems, other image-forming apparatus and methods, embodied in the present invention, will be described as follow:

(24) An image-forming apparatus, which conducts quasi-halftone processing in respect to an inputted image signal, characterized in that said image-forming apparatus makes a judgment whether or not it has at least one of:

a first gradation characteristic in which the maximum absolute value of the difference between a lightness gradation curve obtained on the basis of images varying in lightness and/or density formed by said image-forming apparatus and its smoothed curve with its data obtained by averaging out the original data over a range of about 1/10 of its number of gray levels (hereinafter, also referred to as a gradation number) is not greater than 1;

a second gradation characteristic in which the maximum absolute value of first order differential values of the difference curve between a lightness gradation curve obtained on the basis of images varying in lightness and/or density formed by said image-forming apparatus and its smoothed curve with its data obtained by averaging out the original data over a range of 1/10 of the number of gray levels is not greater than 100; and a third gradation characteristic in which the maximum absolute value of first order differential values of the difference curve between the first smoothed curve with its data obtained by averaging out the original data over a range of about 1/100 of the number of gray levels and the second smoothed curve with its data obtained by averaging out the original data over a range of about 1/10 of said number of gray levels, both of which are based on a lightness gradation curve obtained on the basis of images varying in lightness and/or density formed by said image-forming apparatus, is not greater than 100.

(25) An image-forming apparatus, characterized by comprising:

inputting means for inputting an image signal, setting means for setting a gradation-converting curve, converting means for practicing gradation-converting processing on the basis of said set gradation-converting curve for an inputted image signal, halftone-processing means for applying quasi-halftone processing to said converted image signal, and gradation-characteristic-evaluating means for evaluating the gradation characteristic of said set gradation-converting curve.

(26) A method for evaluating a gradation characteristic of an image-forming apparatus characterized in that an index of said gradation characteristic is obtained by utilizing a smoothed curve of a gradation curve.

The image-forming apparatus, described in item 24, is an image-forming apparatus, which conducts a quasi-halftone processing in respect to an inputted image signal, comprising at least one of a first gradation characteristic in which the maximum absolute value of the difference between a lightness gradation curve obtained on the basis of images having varying lightness and/or density formed by said image-forming apparatus and its smoothed curve with its data obtained by averaging out the original data over a range of about 1/10 of its number of gray levels is not greater than 1, a second gradation characteristic in which the maximum absolute value of first order differential values of the difference curve between a lightness gradation curve obtained on the basis of images having varying lightness and/or density formed by said image-forming apparatus and its smoothed curve with its data obtained by averaging out the original data over a range of 1/10 of said number of gray levels is not greater than 100, and a third gradation characteristic in which the maximum absolute value of first order differential values of the difference curve between the first smoothed curve with its data obtained by averaging out the original data over a range of about 1/100 of its number of gray levels and the second smoothed curve with its data obtained by averaging out the original data over a range of about 1/10 of said number of gray levels, both of which are based on a lightness gradation curve obtained on the basis of images having varying lightness and/or density formed by said image-forming apparatus, is not greater than 100; therefore, an image having a high image quality can be formed. For an example of a gradation characteristic, the smoothness of a gradation curve can be cited.

Further, it is desirable that the aforesaid image-forming apparatus employs an ink jet method.

An image-forming apparatus, described in item 26, is an image-forming apparatus comprising inputting means for inputting an image signal, setting means for setting a gradation-converting curve, converting means for practicing gradation-converting processing on the basis of said set gradation-converting curve for an inputted image signal, halftone-processing means for applying quasi-halftone processing to said converted image signal, and gradation-characteristic-evaluating means for evaluating the gradation characteristic of said set gradation-converting curve; therefore, it can evaluate its gradation characteristic for itself, and in the case where its gradation characteristic is unsuitable, by changing the setting, an image having a higher image quality can be formed.

Further, it is desirable that the aforesaid image-forming apparatus employs an ink jet method.

Further, it is desirable that the aforesaid means for evaluating a gradation characteristic utilizes a smoothed curve of the aforesaid gradation-converting curve.

Further, it is desirable that the aforesaid means for evaluating gradation characteristic makes any one of judgements, which are a first judgement whether or not the maximum absolute value of the difference between a lightness gradation curve obtained from a set gradation-converting curve and its smoothed curve with its data obtained by averaging out the original data over a range of about 1/10 of its number of gray levels is not greater than 1, a second judgement whether or not the maximum of first order differential values of the difference curve between a lightness gradation curve obtained from the set gradation-converting curve and its smoothed curve with its data obtained by averaging out the original data over a range of 1/10 of said number of gray levles is not greater than 100, and a third judgement whether or not the maximum absolute value of first order differential values of the difference curve between the first smoothed curve with its data obtained by averaging out the original data over a range of about 1/100 of its number of gray levels and the second smoothed curve with its data obtained by averaging out the original data over a range of about 1/10 of said number of gray levels, both of which are based on a lightness gradation curve obtained from the set gradation-converting curve, is not greater than 100.

Further, it is convenient if there is provided warning means for issuing a warning when the gradation characteristic of the set gradation-converting curve is judged not good by the evaluation of the aforesaid means for evaluating a gradation characteristic, because it is notified that the gradation characteristic is unsuitable.

Further, it is desirable that there is provided modifying means for modifying the set gradation-converting curve when the gradation characteristic of the set gradation-converting curve is judged not good by the evaluation of the aforesaid means for evaluating a gradation characteristic, because the gradation-converting curve can be modified so as to obtain a suitable gradation characteristic.

Further, it is convenient if the change of the gradation-converting curve by the aforesaid changing means is performed automatically, because it gets rid of the working time of an operator for it.

Further, it is desirable that the gradation-converting curve modified by the aforesaid modifying means is reevaluated by the aforesaid means for evaluating a gradation characteristic.

Further, it is desirable that the aforesaid image-forming apparatus further comprises memorizing means for memorizing a chart-image signal corresponding to a chart image for calibration, means for printing a chart image on the basis of the aforesaid chart-image signal, a data inputting means for inputting measured data, producing means for producing a corrected curve from the inputted measured data, and setting means for setting the produced corrected curve as a gradation-converting curve.

Further, it is desirable that the aforesaid data inputting means comprises measuring means for measuring the density and/or lightness of the aforesaid chart image, because the density and/or lightness of the printed chart image is automatically inputted.

A method for evaluating an image, described in item 26, is a method for evaluating an image for evaluating gradation characteristic of an image-forming apparatus, wherein an index of a gradation characteristic is obtained by utilizing a smoothed curve of a gradation curve; therefore, a gradation characteristic can be suitably evaluated.

Further, it is desirable that the aforesaid gradation curve is represented in the lightness domain. The reason is that it is more suitable for the evaluation through the sense of sight, because the scale in the lightness domain makes the human eyes feel natural variation better than the scale in the density domain.

Further, it is desirable that the aforesaid index of a gradation characteristic utilizing a smoothed curve is obtained from the difference between a gradation curve and a smoothed curve. In this case, it is desirable that the smoothed curve is obtained by averaging out the original data over a range of 1/10 of its number of gray levels.

Further, it is desirable that the aforesaid index of a gradation characteristic utilizing a smoothed curve is obtained from the first order differential values of the difference curve between a gradation curve and a smoothed curve. In this case, it is desirable that the smoothed curve is obtained by averaging out the original data over a range of 1/10 of its number of gray levels.

Further, it is desirable that the aforesaid index of a gradation characteristic utilizing a smoothed curve is obtained from the first order differential values of the difference curve between a smoothed curve averaged over a narrow range and a smoothed curve averaged over a broad range. In this case, it is desirable that the smoothed curve averaged over a broad range is obtained by averaging out the original data over a range of a 1/10 of its number of gray levels, and the smoothed curve averaged over a narrow range is obtained by averaging out the original data over a range of 1/100 of said number of gray levels.

Further, it is desirable that, the smaller the maximum absolute value of the aforesaid index of a gradation characteristic is, the better the result of evaluating the gradation characteristic is.

Further, it is desirable that the smaller the number of absolute peak values of a gradation characteristic which are greater than a certain threshold value is, the better the result of evaluating the gradation characteristic is.

Further, it is desirable that the smaller the value obtained by squaring and integrating the values of the curve of the index of a gradation characteristic is, the better the result of evaluating the gradation characteristic is.

Further, it is desirable that the aforesaid image-forming apparatus can form an image of an object to be used in medical treatment and changes the aforesaid threshold value in accordance with at least one of the kind of radiographing apparatus utilized for radiographing the inputted image (modality), and the radiographed region of the object.

Further, in the case where the aforesaid image-forming apparatus comprises quasi-halftone-processing means, the above-mentioned evaluation of a gradation characteristic is especially effective. The reason is that the effect of improving image quality can be expected by the evaluation of gradation characteristic, because the possibility of the gradation characteristic being made worse by a quasi-halftone processing.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Figure 1:
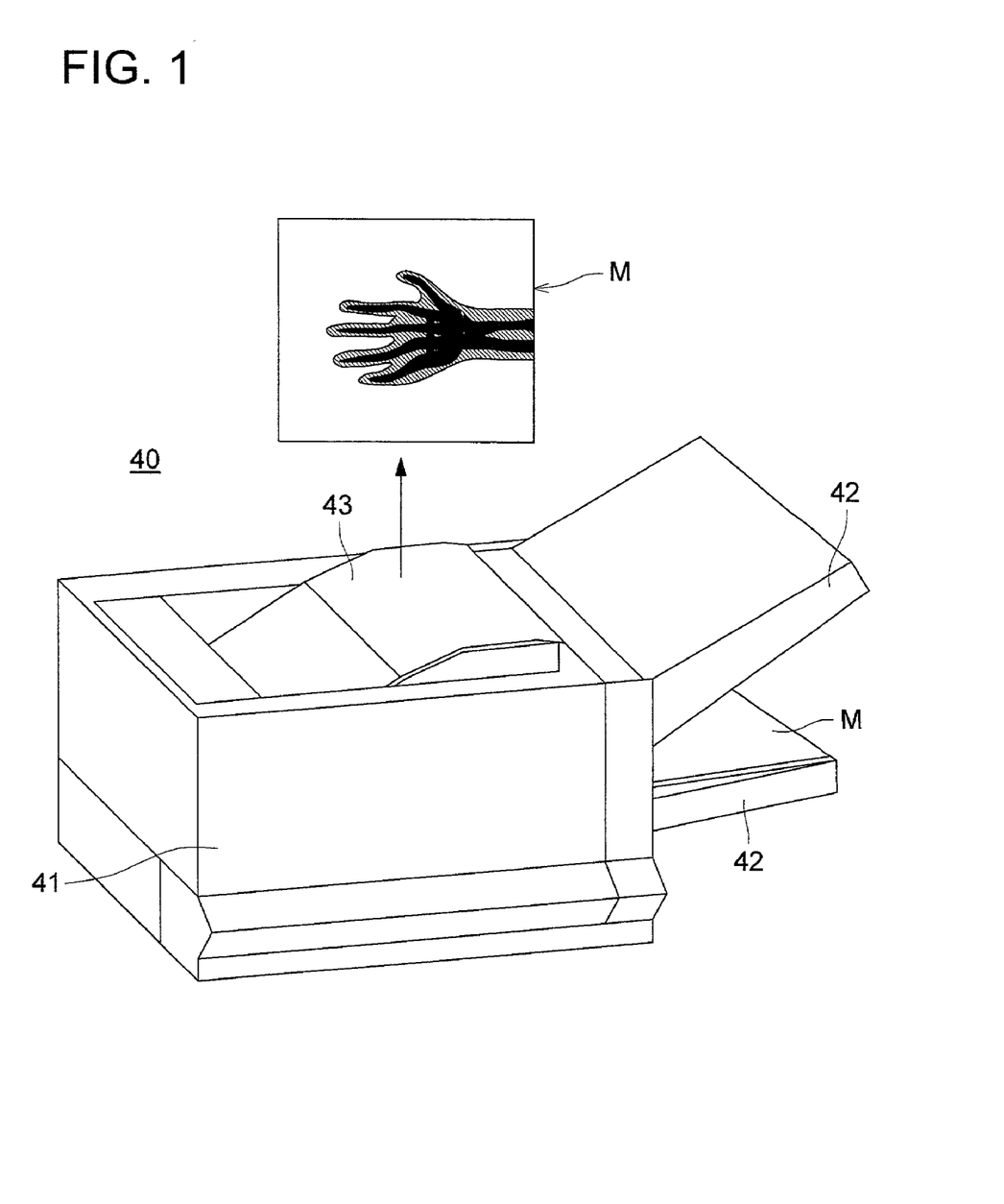
FIG. 1 is a perspective view of a recording apparatus of an ink jet type 40, which is an image forming apparatus of this embodiment of the invention.

In the following, this invention will be explained by referring to an embodiment. FIG. 1 is a perspective view of the recording apparatus of an ink jet type 40, which is an image-forming apparatus of this embodiment of the invention. The recording apparatus of an ink jet type 40 is an apparatus capable of applying a quasi-halftone processing such as an error-diffusion processing or a dither processing to an inputted image signal, making ink drops adhere onto a recording medium by an ink jet method on the basis of the processed image signal, and forming an image having a halftone. This recording apparatus of an ink jet type 40 has feeding trays, for example on two stages, provided in the apparatus mainframe 41, and feeds a recording medium M, which is set in one of the feeding trays, for example a lower feeding tray 42, to the inside of the apparatus mainframe 41; the recording medium M having an image formed on it is collected on an ejection section 43.

Figure 2:
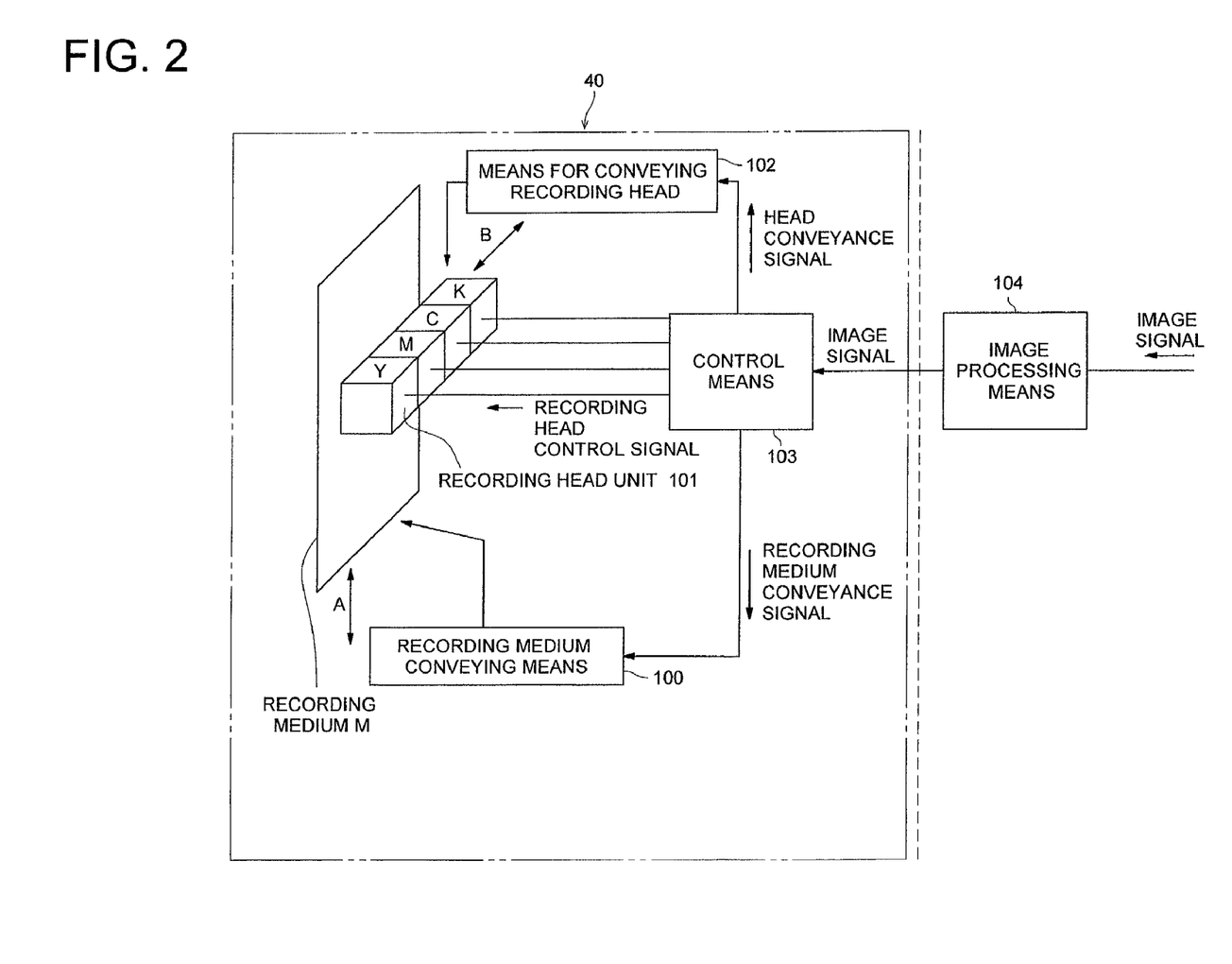
FIG. 2 is a block diagram showing the outline of the structure of the recording apparatus of an ink jet type 40.

FIG. 2 is a block diagram showing the outline of the structure of the recording apparatus of an ink jet type 40. In the recording apparatus of an ink jet type 40 of this embodiment, there are provided a recording-medium-conveying means 100, a recording head unit 101, a recording-headconveying means 102, and a control means 103. The recording-medium-conveying means 100 conveys the recording medium M to the direction of the arrow mark A on the basis of a recording-medium-conveyance signal. The recording head unit 101 as a printing means is arranged in such a manner as to be capable of moving in the direction perpendicular to the conveying direction of the recording medium M.

In this embodiment, in this recording head unit 101, the recording heads corresponding to yellow (Y), magenta (M), and cyan (C) respectively are arranged in a line. These heads may be integrated or may be provided discretely. In the case of a monochromatic image, it is appropriate to provide a plurality of heads for K (black) ink having different concentrations respectively. The recording-medium-conveying means 102 makes the recording head unit 101 move to the direction of the arrow mark B on the basis of a head-conveyance signal from a control means 103, and the recording heads form an image on the recording medium M on the basis of a recording-head-controlling signal (corresponding to an image signal) from the control means 103. The image-processing means 104 is used also as inputting means, setting means, converting means, data-inputting means, producing means, and halftone-processing means. Further, the control means 103 is used also as gradation-characteristic-evaluating means and memory means.

Incidentally, there is a problem that a quasi-halftone processing performed in the image-processing means 104 sometimes makes the gradation curve not smooth, which depends on the processing method, to produce a granular printed image, which lowers the image quality. For this reason, it is necessary to adjust the quasi-halftone processing in order that the gradation curve may become smooth by evaluating gradation characteristic. The method of evaluating a gradation characteristic is as follows.

Figure 3:
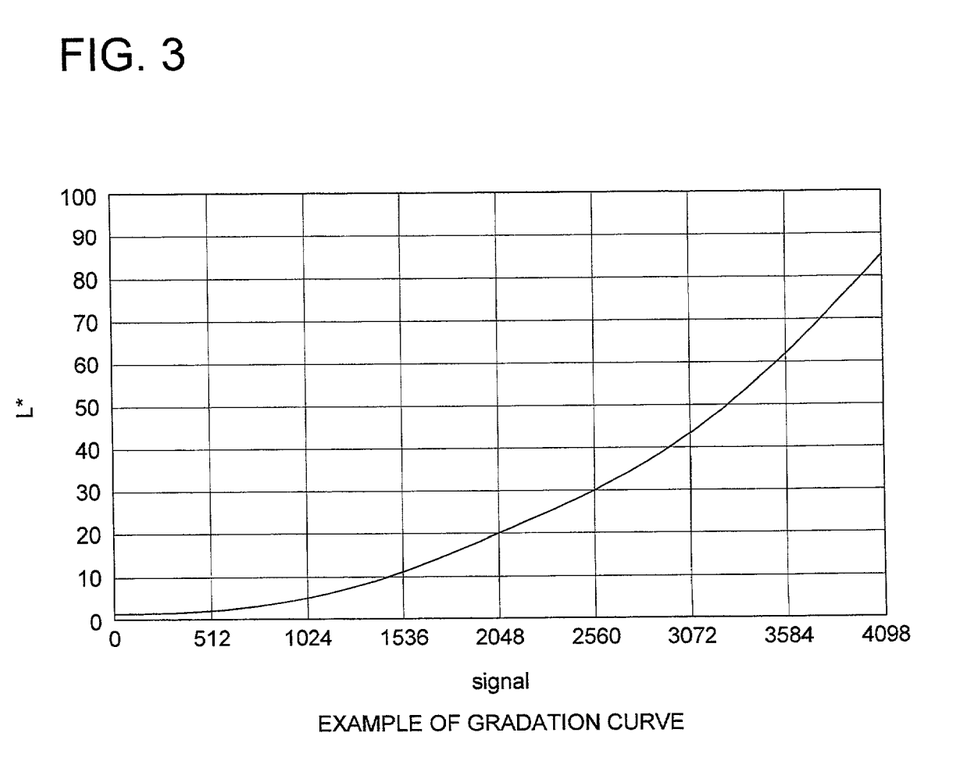
FIG. 3 is a drawing showing an example of a gradation curve.

First, by the recording apparatus of an ink jet type 40, a patch image for each of image signals, which make a standard and are memorized in the control means 103, is printed, and a gradation curve of lightness is obtained by measuring the lightness of each of the patches (FIG. 3). It is desirable that a densitometer (measuring means: not shown in the drawing) for measuring lightness is provided in the recording apparatus of an ink jet type 40. Further, by utilizing the obtained gradation curve, the following three kinds of gradation-characteristic evaluations are carried out. It is unnecessary for the number of patches to be measured to be equal to the number of all gray levels, but points not less than 200 give a good precision. The following evaluation and judgement are practiced in the control means 103.

(1) The first judgement method for evaluating a gradation characteristic from a gradation curve of lightness will be explained. A curve, which is the result of smoothing the gradation curve by averaging out the original data over a range of about 1/10 of the number of gray levels, is obtained. The range of about 1/10 of the number of gray levels means, for example in the case of an image having 12 bits (4096 gray levels), about 400 levels. However, in the case where the measured patch has 512 points for every 8 gray levels, the range of 400 gray levels corresponds to 50 points. The smoothed curve is obtained by making it a new gradation data the average value over the data of the points at both sides of the gray level of interest. For example, in the case of an image of 12 bits (4096 gray levels), the gray level data for a signal value of 1000 is obtained as an average value of gray level data corresponding to a range from a signal value of 800 to a signal value of 1200. For the average, both of a simple average and a center-weighted average may be used. For the end portion of the gradation curve, averaging is to be practiced over the number of points in the range where averaging can be done, because the width for averaging is not sufficient. If the maximum absolute value of the difference curve obtained between the above-mentioned smoothed curve and the gradation curve is not greater than 1 (0.6 in the case where a higher image quality is required), the gradation characteristic (smoothness) is judged good.

Figure 4:
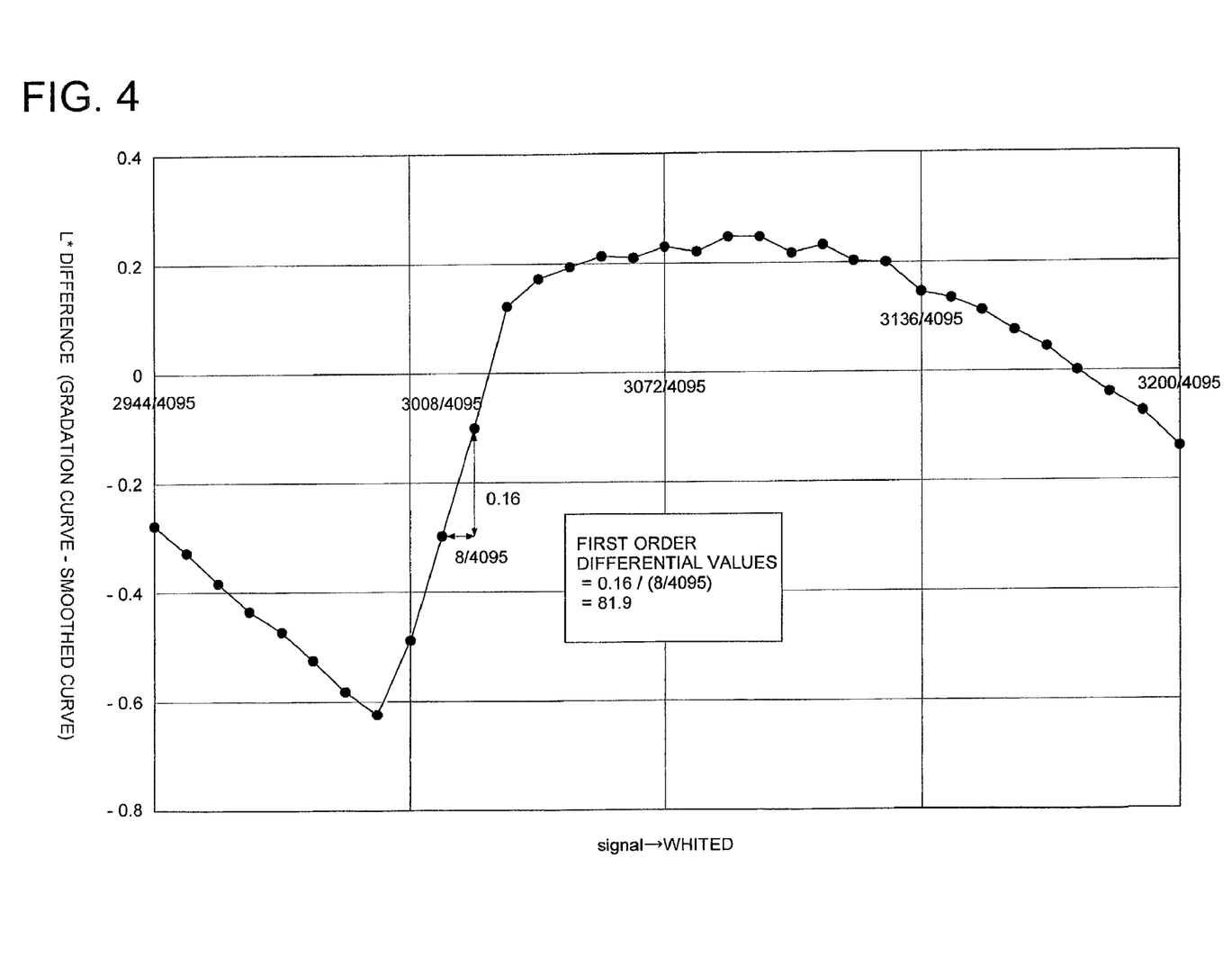
FIG. 4 is a drawing showing the method of calculating first order differential values.

(2) The second judgement method for evaluating a gradation characteristic from a gradation curve of lightness will be explained. A curve, which is the result of smoothing the gradation curve by averaging out the original data over a range of about 1/10 of the number of gray levels, is obtained. Then, the difference curve between this smoothed curve and the gradation curve is obtained, and its first order differential is obtained. In this embodiment, as shown in FIG. 4, the first order differential is obtained as a value of the quotient when the difference between two neighboring gray level values is divided by the difference between the corresponding neighboring signal values in the abscissa, which are normalized in such a way that the range from the minimum value to the maximum value is made 1. If the maximum absolute value of these first order differential values is not greater than 100 (60 in the case where a higher image quality is required), the gradation characteristic (smoothness) is judged good.

(3) The third judgement method for evaluating a gradation characteristic from a gradation curve of lightness will be explained. Two curves, which are the results of smoothing the gradation curve by averaging out the original data over a range of about 1/10 and over a range of about 1/100 respectively of the number of gray levels, are obtained. Then, the difference curve between these two smoothed curves is obtained, and its first order differential values are obtained. If the maximum absolute value of these first order differential values is not greater than 100 (60 in the case where a higher image quality is required), the gradation characteristic (smoothness) is judged good.

In the case where gradation characteristic is evaluated by the above-mentioned three judgement methods and gradation characteristic is judged bad by any one of the methods, it is necessary to make the gradation curve smooth by adjusting the condition of the quasi-halftone processing, applying gradation-correcting processing, or the like. Gradation correction can be also included in calibration-gradation-correcting curve to be described later.

Figure 5:
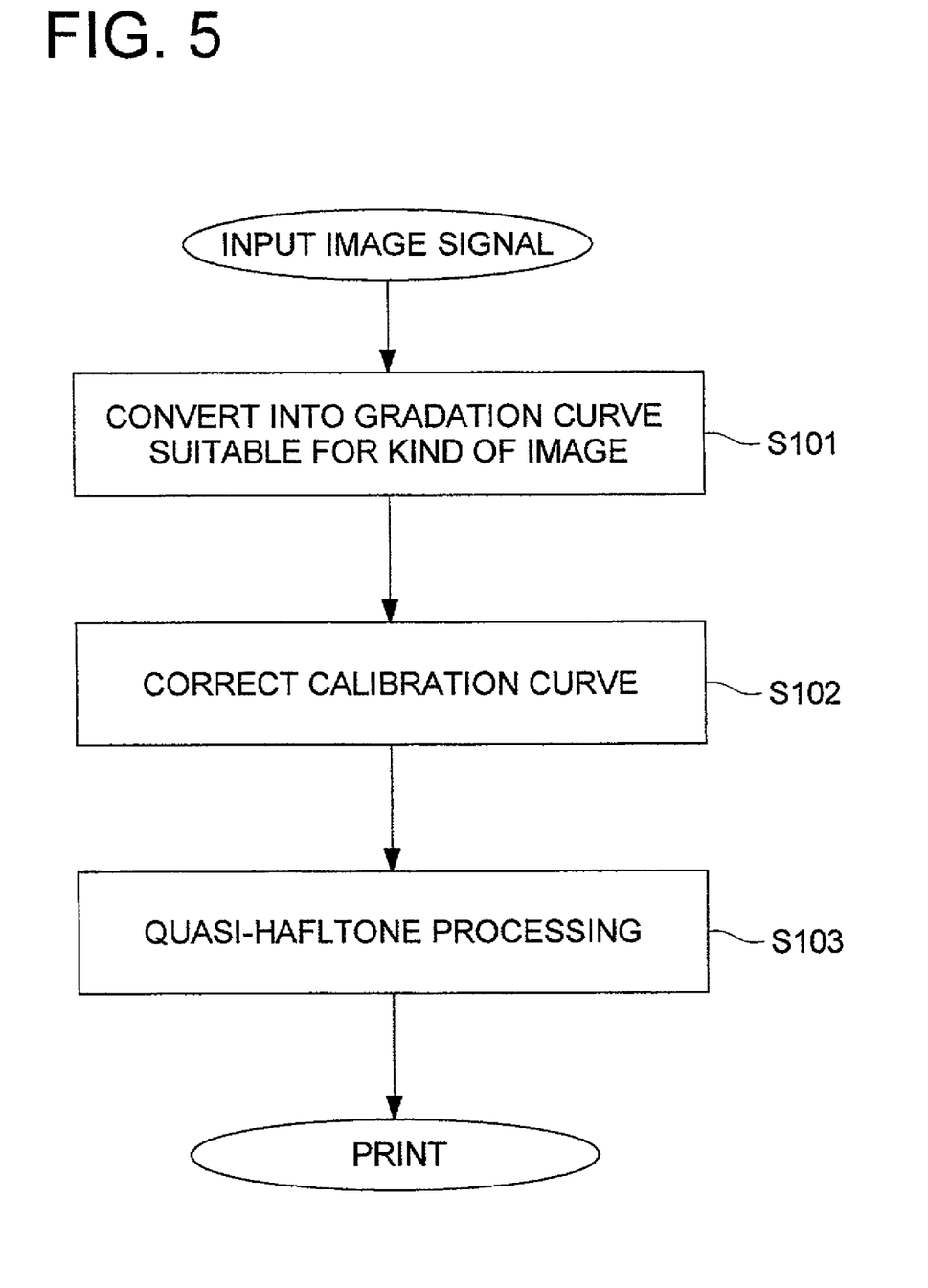
FIG. 5 is a drawing showing the flow of processing in the recording apparatus of an ink jet type 40.

Next, an actual example of processing in the recording apparatus of an ink jet type 40 will be explained. FIG. 5 is a flow chart showing such a processing. An image signal inputted in the recording apparatus of an ink jet type 40 is converted on the basis of a gradation curve which is suitable for the kind of the image corresponding to the signal (step S101). For example, in the case of a CR image, a gradation curve which is linear in terms of density is utilized, and for a CT or an MR image, a gradation curve which appears to have the same gradation as the monitor display is utilized.

Next to the above, the converted image signal is corrected in the step S102 on the basis of a calibration-gradation curve for absorbing daily fluctuation based on the variation of temperature, humidity, etc., and further, after a quasi-halftone processing which is peculiar to an ink jet printer is carried out (step S103), an image is printed on the basis of the processed data. In this embodiment, each of the above-mentioned evaluations of gradation characteristic corresponds to each image processing in the respective steps.

A calibration-gradation-correcting curve can be obtained in the following way. In the same way as mentioned above, on the basis of the image signal for calibration which is stored in a memory means (not shown in the drawing) of the recording apparatus of an ink jet type 40, a chart image is printed and the density of the patch is measured. When the density data, which have been obtained by this measurement, are inputted to the recording apparatus of an ink jet type 40, the inverse function of the gradation curve based on the measured data is obtained inside it, and a calibration-gradation-correcting curve can be produced by it. By making a conversion based on this curve, suitable printing with a gradation which is proportional to a signal value in terms of density can be performed.

With respect to the measurement of density and the data input, it is appropriate to measure the density by an operator using a densitometer which is provided independently of the recording apparatus of an ink jet type 40, to input numerical values to the recording apparatus of an ink jet type 40, or also it is possible that the density is automatically measured by a densitometer which is built in the recording apparatus of an ink jet type 40, and automatic input of the density data is carried out.

However, sometimes the calibration-gradation-correcting curve does not become smooth owing to it that an error occurs in measurement, a mistake is made in inputting measured data, or dispersion of the data resulting from measurement errors. If the curve which is not smooth is utilized as it is, the image becomes granular and the image quality is deteriorated; therefore, it is necessary to apply a smoothing processing to it or to set a smooth curve by carrying out a measurement again.

The flow of this processing will be explained more concretely. First, an image for calibration is printed on the basis of data memorized beforehand in the recording apparatus of an ink jet type 40, the density of every patch is measured, and the density data are inputted with a density-data-inputting screen through a screen for setting a calibration-gradation-correcting curve (not shown in the drawing). A calibration-gradation-correcting curve is obtained from the inverse function of the inputted density data, and the gradation characteristic is evaluated. If this curve is judged smooth as the result of the evaluation, the curve is set as a calibration-gradation-correcting curve, and the operation in the screen for setting a calibration-gradation-correcting curve is finished. If the gradation is not smooth, a warning to the effect that it is not smooth is issued by a warning means not shown in the drawing, evaluation is carried out again after a smoothing processing is applied to the gradation-correcting curve, or density is measured again to produce a curve again and evaluation is carried out again. It is desirable that this procedure is repeated until the gradation becomes smooth.

Smoothing processing of a curve means to make a curve smooth by making it a data of a point of interest, an average value or a weighted average value of plural points in the neighborhood of the point. By doing it, minute fluctuations of a curve can be reduced.

Figure 6:
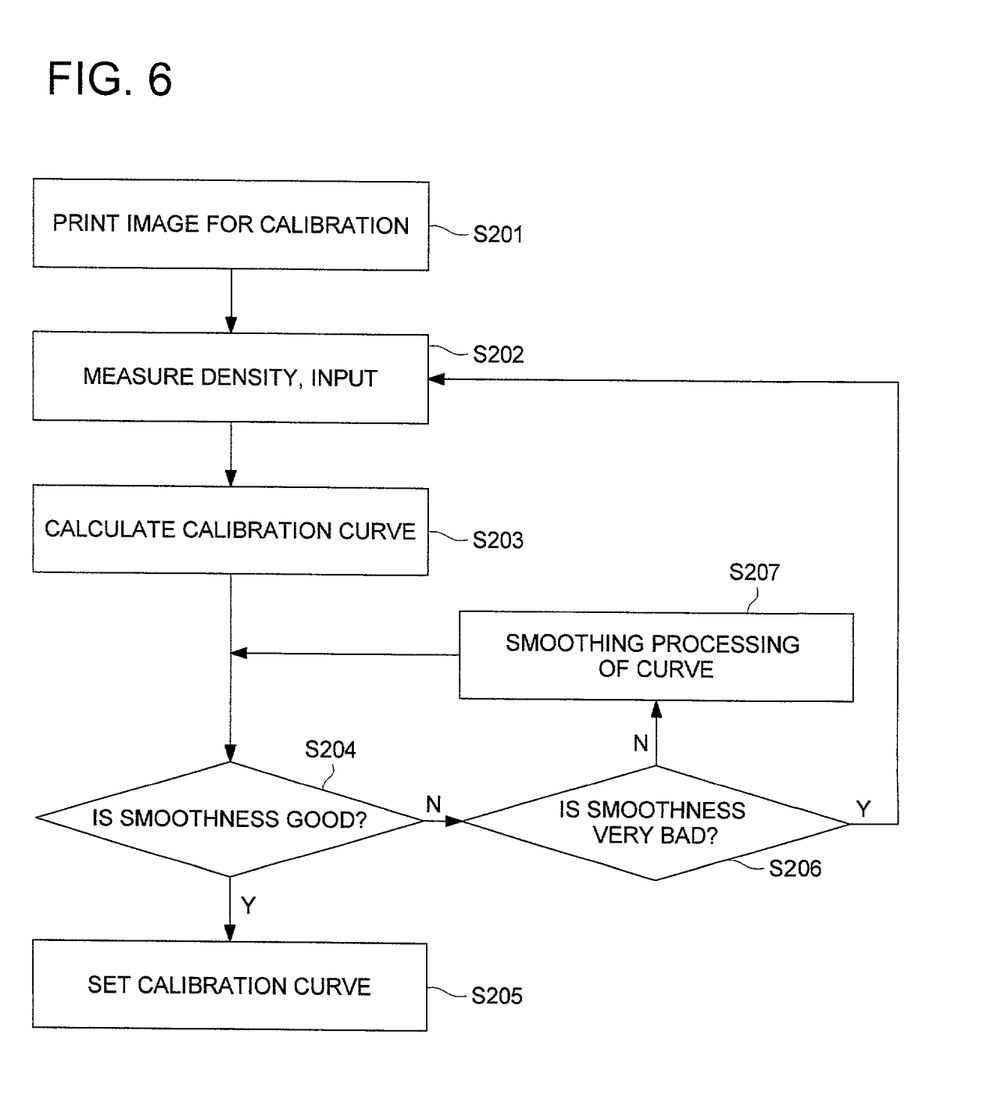
FIG. 6 is a drawing showing an example of the flow of setting a calibration-gradation-correcting curve.

With respect to remaking a curve in the case where it is not smooth, various methods can be considered. An example of it will be shown in the following by referring to the drawing. In FIG. 6, in the step S201, a chart image for calibration is printed, in the step S202, density measurement is carried out and density data are inputted, in the step S203, a curve is calculated, and in the step S204, smoothness is evaluated. Now, if smoothness is judged good, in the step S205, calibration-gradation-correcting curve is set, and if smoothness is judged very bad in the step S206, the density-data-inputting screen is displayed to urge an operator to measure the density again; on the other hand, if smoothness is a little bad, it is considered appropriate that a smoothing processing is applied to the calibration-gradation-correcting curve (step S207).

Figure 7:
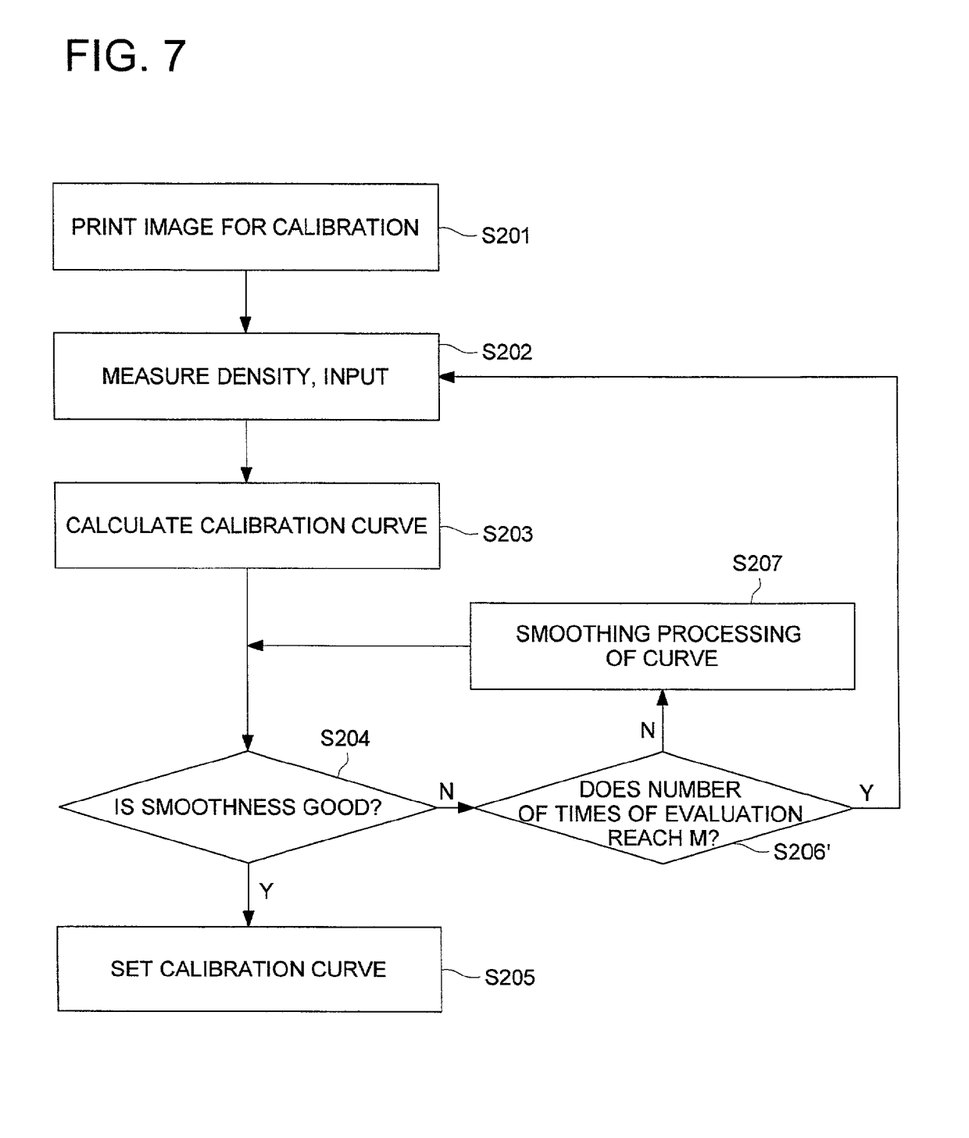
FIG. 7 is a drawing showing a modified example of the flow of setting a calibration-gradation-correcting curve.

Further, for an modified example of this embodiment, also it can be considered that, as shown in the step S206 in FIG. 7, smoothing processing is carried out automatically until the evaluations of a predetermined number of times (M times) are finished, and if smoothness is still bad, a warning to that effect is issued and the screen for inputting density data is displayed, to urge an operator to measure density again.

On the other hand, in the case where a gradation curve which is suitable for the kind of image is set (S101), it is necessary to evaluate the smoothness, whether the curve is smooth or not. In the screen for setting a gradation curve, an operator inputs the gradation curve. The input of this curve may be done by inputting a plurality of numerical data or by a function. Through evaluating the smoothness of the curve, the gradation curve is set if its smoothness is good. If the smoothness is bad, it is appropriate that a warning to that effect is issued and the screen for inputting a gradation curve is displayed again or the curve is subjected to smoothing processing.

Another embodiment will be explained. Assuming that data used in this case have 12 bits, a patch image having 4096 levels corresponding to all of the gray levels is produced and outputted by the recording apparatus of an ink jet type 40. Further, through measuring the lightness of every patch by a densitometer, a gradation curve in lightness domain is obtained. In addition, also it is possible to evaluate not the total gradation characteristic of the printer but the part of gradation characteristic for quasi-halftone processing only. In this case, it is appropriate that a quasi-halftone processing is applied to the patch image signal for 4096 levels, and a gradation curve is obtained by calculating the average lightness in each patch.

In respect to the number of patches for obtaining a gradation curve, it is possible to obtain a smoothness even though not all of gray levels are employed, but the precision is a little lowered. In the case where measurement is carried out through actually printing, it is of no problem to measure, for example, 512 levels for every 8 signal values only, because measuring 4096 levels takes time and there is some dispersion also in measurement. However, in the case of evaluation of quasi-halftone processing itself, the values can be obtained by calculation, and there is some risk to overlook a defect in the gradation levels which have not been calculated; therefore, it is desirable to obtain a gradation curve by using all levels if possible.

Figure 8:
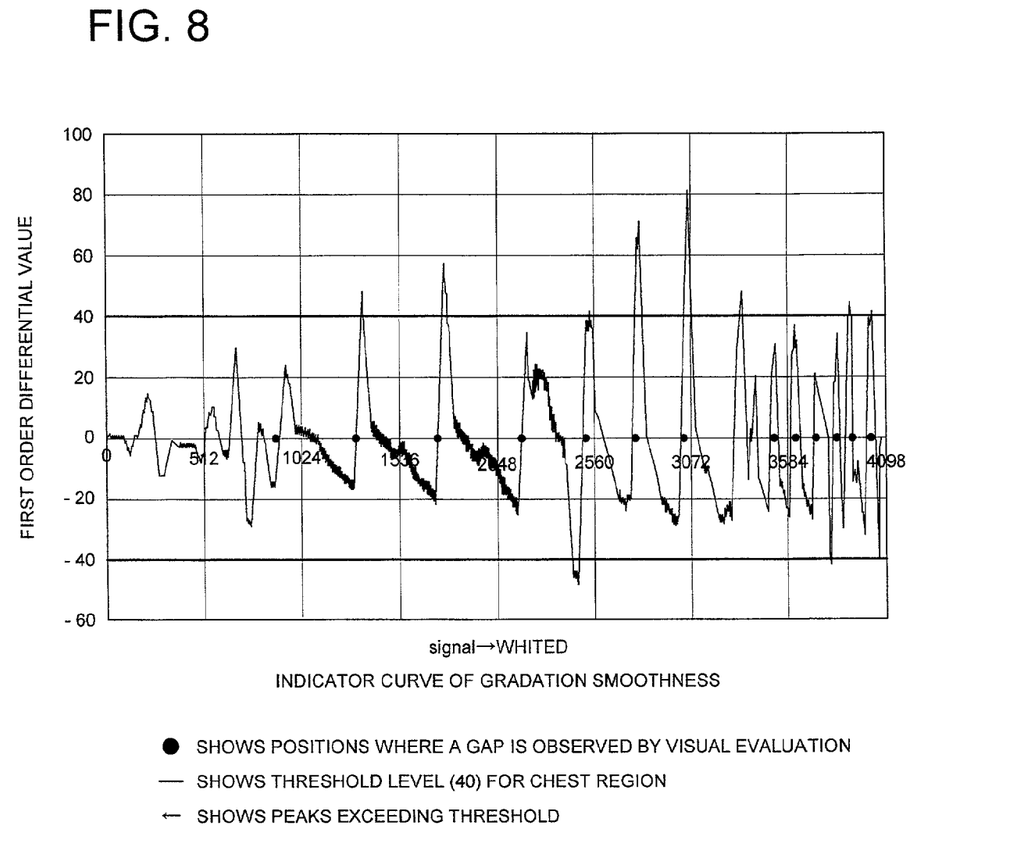
FIG. 8 is a drawing showing an example of a curve of an index of gradation characteristic.

Next, an index of a gradation characteristic is calculated from a gradation curve. A method of it is such one that an average curve over a narrow range and an average curve over a broad range are obtained, the difference curve of the two average curves is obtained, and its first order differential values are made to compose the index curve of the gradation characteristic (that is, an index of a gradation characteristic) (FIG. 8). The narrow range means, for example, a range of about 1/100 of the number of gray levels, that is, a range of about 40 signal values for a 12 bit image, and the broad range means, for example, a range of about 1/10 of the number of gray levels, that is, a range of about 400 signal values for the same 12 bit image. As for the method of averaging, in addition to simple averaging of data in both sides of the point of interest, also center-weighted averaging may be used. In the above, a first order differential value is obtained as a quotient value when the difference between two neighboring gradation levels is divided by the difference between corresponding two neighboring signal values, which are normalized in such a way that the range from the minimum value to the maximum value is reduced to 1.

Further, evaluation is made on the basis of the index curve obtained as follows:

(a) A gradation characteristic is worse, the more the number of absolute peak values of the index curve of the gradation characteristic is.

(b) A gradation characteristic is worse, the larger the maximum value of the absolute values of the index curve of the gradation characteristic is.

(c) A gradation characteristic is worse, the larger the integrated value of the squared values of the index of the gradation characteristic is.

For example, in the case of an X-ray image of a chest region, it is obtained from an experiment that a level of the difference, which can be discriminated between an image and the one converted to have a linear gradation when they are compared with the both images arranged side by side, is about 40 in terms of the peak value of the index curve of the gradation characteristic. Because the gradation curve is not smooth for lightness values corresponding to peaks having a value not smaller than this, granular unevenness appears on the image.

Threshold values in the cases of other modalities (radiographing apparatus) and regions for diagnosis are obtained from experiments as shown below.

| Modality (Region) | Threshold of evaluation |
| --- | --- |
| MRI | 60 |
| CR (Chest region) | 40 |
| CR (Bone region) | 60 |

When an image having a certain gradation characteristic is observed singly, the above-mentioned difference can not be recognized so strictly as they are compared in a side-by-side arrangement; therefore, it is appropriate to make an evaluation that a smoothness (a gradation characteristic) is not good if the peak value of the index of the gradation characteristic is not smaller than 100.

As described in the foregoing, according to this invention, it is possible to provide an image-forming apparatus having an excellent gradation characteristic and a method for evaluating a gradation characteristic capable of actualizing such an image-forming apparatus as this.

Disclosed embodiment can be varied by a skilled person without departing from the spirit and scope of the invention.

What is claimed is:

1. An image-forming apparatus, which conducts a quasi-halftone processing in respect to image signals, comprising:
   an inputting section to input said image signals; and
   a converting section to apply a gradation-converting processing to said image signals inputted by said inputting section, on the basis of a predetermined gradation-converting curve, to generate converted image signals;
   wherein said predetermined gradation-converting curve includes at least one of:
      a first gradation characteristic in which a maximum absolute value of a difference between a lightness gradation curve obtained on the basis of lightness and/or density varying image signals generated by said image-forming apparatus and its smoothed curve in a range of about 1/10 of its gradation number is not greater than 1;
      a second gradation characteristic in which a maximum absolute-value of first order differential values of a difference curve between a lightness gradation curve obtained on the basis of lightness and/or density varying image signals generated by said image-forming apparatus and its smoothed curve in a range of about 1/10 of its gradation number is not greater than 100; and
      a third gradation characteristic in which a maximum absolute-value of first order differential values of a difference curve between a first smoothed curve in a range of about 1/100 of a gradation number and a second smoothed curve in a range of about 1/10 of a gradation number, both of which are generated on the basis of a lightness gradation curve obtained on the basis of lightness and/or density varying image signals formed by said image-forming apparatus, is not greater than 100.

2. The image-forming apparatus of claim 1, wherein said image-forming apparatus employs an ink-jetting method.

3. The image-forming apparatus of claim 1, further comprising:
   a setting section to set said gradation-converting curve;
   a quasi-halftone processor to apply said quasi-halftone processing to said converted image signals; and
   a gradation-evaluating section to evaluate said gradation-converting curve set by said setting section.

4. An image-forming apparatus, comprising:
   an inputting section to input image signals;
   a setting section to set a gradation-converting curve;
   a converting section to apply a gradation-converting processing to said image signals inputted by said inputting section, on the basis of said gradation-converting curve, to generate converted image signals;
   a quasi-halftone processor to apply a quasi-halftone processing to said converted image signals; and
   a gradation-evaluating section to evaluate said gradation-converting curve set by said setting section.

5. The image-forming apparatus of claim 4, wherein said image-forming apparatus employs an ink-jetting method.

6. The image-forming apparatus of claim 4, wherein said gradation-evaluating section utilizes a smoothed curve of said gradation-converting curve.

7. The image-forming apparatus of claim 6, wherein said gradation-evaluating section conducts at least one of:
   a first determining-action to determine whether or not a maximum absolute-value of difference values between a lightness gradation curve and its smoothed curve is lower than 1, by obtaining said lightness gradation curve from said gradation-converting curve, set by said setting section, and by obtaining said smoothed curve from said lightness gradation curve in a range of about 1/10 of its gradation number;
   a second determining-action to determine whether or not a maximum absolute-value of first order differential values of a difference curve between a lightness gradation curve and its smoothed curve is lower than 100, by obtaining said lightness gradation curve from said gradation-converting curve, set by said setting section, and by obtaining said smoothed curve from said lightness gradation curve in a range of about 1/10 of its gradation number; and a third determining-action to determine whether or not a maximum absolute-value of first order differential values of a difference curve between a first smoothed curve and a second smoothed curve is lower than 100, by obtaining said lightness gradation curve from said gradation-converting curve, set by said setting section, and by obtaining said first smoothed curve from said lightness gradation curve in a range of about 1/10 of its gradation number and by obtaining said second smoothed curve from said lightness gradation curve in a range of about 1/100 of its gradation number.

8. The image-forming apparatus of claim 4, further comprising:

a warning section to issue a warning when said gradation-evaluating section determines that said gradation-converting curve, set by said setting section, is not good.

9. The image-forming apparatus of claim 4, further comprising:

a gradation-modifying section to modify said gradation-converting curve, when said gradation-evaluating section determines that said gradation-converting curve, set by said setting section, is not good, to generate a modified gradation-converting curve.

10. The image-forming apparatus of claim 9, wherein an operation for modifying said gradation-converting curve is automatically performed in said gradation-modifying section.

11. The image-forming apparatus of claim 9, wherein said gradation-evaluating section reevaluates said modified gradation-converting curve, after modified by said gradation-modifying section.

12. The image-forming apparatus of claim 4, further comprising:

a memory to store chart-image signals corresponding to a calibration-chart image utilized for a calibrating operation;

a printing section to print said calibration-chart image based on said chart-image signals;

a data inputting section to input measured data; and a compensation curve creating section to create a compensation curve from said measured data inputted by said data inputting section;

wherein said setting section establishes said compensation curve as said gradation-converting curve.

13. The image-forming apparatus of claim 12, wherein said data inputting section comprises:

a measuring device to measure density and/or lightness of said calibration-chart image.

14. A method for evaluating a gradation characteristic of an image-forming apparatus, comprising a step of:

finding an index of said gradation characteristic by utilizing a smoothed curve of a gradation curve.

15. The method of claim 14, wherein said gradation curve is defined in a scale of lightness.

16. The method of claim 14, wherein said index of said gradation characteristic is found from a difference between said gradation curve and said smoothed curve.

17. The method of claim 14, wherein said index of said gradation characteristic is found by first order differentiating a difference curve between said gradation curve and said smoothed curve.

18. The method of claim 14, wherein said index of said gradation characteristic is found by first order differentiating a difference curve between a smoothed curve in a narrow range and another smoothed curve in a wide range.

19. The method of claim 14, wherein the smaller a maximum value of said index of said gradation characteristic is, the better a result of evaluating said gradation characteristic is.

20. The method of claim 14, wherein the smaller a number of absolute peak values of said index of said gradation characteristic, which are greater than a threshold value, is, the better a result of evaluating said gradation characteristic is.

21. The method of claim 20, wherein said image-forming apparatus can form a subject image utilized for a medical treatment, and changes said threshold value in response to at least one of a kind of image-capturing apparatus utilized for capturing an inputted image and a concerned part of a subject.

22. The method of claim 14, wherein the smaller a value obtained by squaring and integrating a curve of said index of said gradation characteristic, the better a result of evaluating said gradation characteristic is.

23. The method of claim 14, wherein said image-forming apparatus comprises a quasi-halftone processor.

* * * * *